United States Patent
Boland et al.

(10) Patent No.: US 6,868,172 B2
(45) Date of Patent: Mar. 15, 2005

(54) METHOD FOR REGISTERING IMAGES IN A RADIOGRAPHY APPLICATION

(75) Inventors: John T. Boland, Fairport, NY (US); John P. Spoonhower, Webster, NY (US); John R. Squilla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 714 days.

(21) Appl. No.: 09/970,243

(22) Filed: Oct. 3, 2001

(65) Prior Publication Data

US 2003/0063788 A1 Apr. 3, 2003

(51) Int. Cl.[7] .................................................. G06K 9/00
(52) U.S. Cl. ........................................................ 382/132
(58) Field of Search ................................ 382/128, 131, 382/132, 151, 294; 250/390.02, 482, 584, 370.09, 370.1; 378/4, 21, 37, 62; 430/22; 702/8, 40, 172; 604/20; 435/447

(56) References Cited

U.S. PATENT DOCUMENTS

| | | | |
|---|---|---|---|
| 4,644,582 A | * 2/1987 | Morishita et al. | ............ 382/130 |
| 5,954,650 A | * 9/1999 | Saito et al. | .................. 600/425 |
| 5,982,953 A | * 11/1999 | Yanagita et al. | ............ 382/294 |
| 6,163,620 A | 12/2000 | Hojnacki et al. | ............ 382/162 |
| 6,266,453 B1 | * 7/2001 | Hibbard et al. | ............. 382/294 |
| 2001/0036302 A1 | * 11/2001 | Miller | ........................ 382/128 |

OTHER PUBLICATIONS

"Clear Change Imagery Service"—Eastman Kodak Company Product Information.

"The Image Processing Handbook", 2nd edition, by John C. Russ, CRC Press, 1995, pp. 201–208.

* cited by examiner

Primary Examiner—Andrew W. Johns
Assistant Examiner—Shervin Nakhjavan
(74) Attorney, Agent, or Firm—David M. Woods

(57) ABSTRACT

An image registration method is described for X-ray imagery, in which specific views of the x-rays are provided to optimize tie point selection accuracy and efficiency. The first view maintains context during initial point selection. The second view provides a detailed view of each point pair, to allow for fine adjustment, while automatically presenting each point pair in sequence to the user. After the tie points are refined and the images are registered, a third view is provided which allows direct comparison of the registered images.

23 Claims, 5 Drawing Sheets

METHOD FOR REGISTERING IMAGES IN A RADIOGRAPHY APPLICATION

FIELD OF THE INVENTION

This invention pertains to the field of dental imagery, and in particular to the field of image registration as specifically related to dental X-ray imagery.

BACKGROUND OF THE INVENTION

Image registration in general is concerned with determining a precise geometric match between two or more images, of the same object or area, that are from different times or taken from different positions relative to the image content. In the present invention, the primary emphasis is on images (dental radiographs) taken on different dates or times. Comparison of such imagery, after registration, allows detailed analysis of any changes that may have occurred, e.g., new or larger cavities, bone loss, loosened fillings, etc.

Registration can also be applied to two different forms of data such as a map and an image of the same area. The registration process relies on tie points, which are points (image positions) of the same object in different images. Tie points must be accurately placed, and must be unambiguously identified. The tie points are then used to generate a polynomial function that is used to warp one image to another.

Tie point selection can be an arduous process, requiring users to repeatedly cycle between overviews of the imagery and close-up views as they attempt to identify and then precisely indicate the common locations. The process of "zooming-in" and "zooming-out" can be time consuming, as well as disconcerting, frequently resulting in the user losing context, i.e., not being sure of which part of the image is being viewed.

Image registration is an important element in isolating historical changes in film or digital imagery. Change detection, in this context, is an image based concept, and refers to the process of comparing imagery over an area of interest taken at two different times. Images are compared either manually or automatically to determine those places where some change in the scene content has occurred. Imagery based change detection can be performed on a variety of image types, including panchromatic, color, IR and multi-spectral image types. In some applications, the size, location and type of change can be determined.

In aerial applications (such as the Clear Change Imagery Service provided by Eastman Kodak Company), the before and after images are corrected for differences in rotation, scale and alignment. The process is semi-automatic. The user selects 2–3 common points between the images (using a tie point "wizard"), and the system automatically finds the rest. As part of the registration process, the images are automatically clipped to the maximum overlapping region. Change is represented as a color overlay, in which the presence of a particular color (e.g., green) indicates change at that position.

The underlying correlation routines contained in the aforementioned aerial application were developed specifically for the taking conditions, imagery spectrum, and scene content typical to that application. There are a number of reasons why such routines do not readily transfer over to dental applications:

1. The prior art embodied in Clear Change Imagery Service and the Registration Tool (the latter being a subset of the former) was developed specifically for the case of images to be used for aerial mapping. Such imagery is limited to tilt angles of less than 3 degrees relative to vertical through the means of gyroscopically stabilized mounts. Consequently, the imagery exhibits very little aspect change in the imaged objects. As this is the case, the registration algorithms are able to successfully run without any preliminary image rectification to similar look (capture) angles. The dental case under discussion does not include such control of the acquisition process. Dental x-rays have been known to include as much as 15 degrees of tilt from the vertical and horizontal axes. Further, the tilt values are not recorded, nor are they necessarily the same from x-ray to x-ray.

2. The aerial image case generally produces images of high contrast, and with a significant number of well defined features (exceptions include lakes, deserts, etc.). These two factors combine to provide favorable conditions for automated tie point finding routines that generally rely on correlation of image pixel values around a prospective point. Strong correlation is most often found in cases where distinct patterns are present and which differ significantly from nearby points. Thus the match, or correlation, is more likely to be unique. X-ray images are in general low in contrast, and exhibit large areas of relatively amorphous material, e.g., an image of a tooth (vs. the edge of the tooth), or an image of the gingiva which exhibits fine, but relatively unstructured detail.

3. The aerial image case yields images that are reflective in nature and therefore represent a single instance of the outside surface(s) of the imaged objects. X-ray images are the result of a radiation penetrating process and represent the effect of the integrated density of all material encountered on the transmitted path between the x-ray emitter and the detector (sensitized film or electronic).

It is therefore necessary to specifically address the issues of maintaining context and enabling precision placement of tie points, while also providing a very fast and easy to use process in a dental setting. What is accordingly needed is a technique for efficient preliminary image registration of dental radiographs to similar look angles, which can handle radiographic images that are low in contrast and that exhibit an integrated density of material encountered between the x-ray emitter and the detector (sensitized film or electronic).

SUMMARY OF THE INVENTION

The present invention is directed to overcoming one or more of the problems set forth above. Briefly summarized, according to one aspect of the present invention, a method for placing and confirming reference points associated with image registration for a radiographic image processing application comprises the steps of: (a) obtaining first and second radiographic images representing substantially the same object taken at different times; (b) presenting a "zoomed out" view of the full extent of the first and second radiographic images side by side in a first graphical user interface view in order to allow a user to place potential reference points in their approximate locations on each image, all the while maintaining context for the user; (c) presenting a "zoomed in" view of an area of the first and second images around each of the potential tie points in a second graphical user interface view to allow the user to refine the placement of the potential reference points, thereby enabling the generation of refined reference points suitable for registration; (d) registering the first and second images by utilizing the refined reference points, thereby producing first and second registered images; and (e) utilizing the registered images in a third graphical user interface view to indicate the amount of mismatch between the first and second images.

An advantage of the invention is its relevance to image registration for X-ray imagery, in which specific views of the x-rays are provided to optimize tie point selection accuracy and efficiency. It is very easy to use by even an uninitiated user, and prompts the user through the various steps without the user losing context in the process.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image registration systems employing tie points are well known, the present description will be directed in particular to attributes forming part of, or cooperating more directly with, a method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program. The computer program could also be made available to the operator's computer via a network; the use of the program could be provided as a service for which the operator pays a fee.

Before describing the present invention, it is helpful to understand that the present invention is preferably utilized on any well-known computer system, such a personal computer. Consequently, the computer system will not be discussed in detail herein. It is also instructive to note that the images are either directly input into the computer system (for example, from a digital intra-oral camera or a digital radiographic source) or digitized before input into the computer system (for example, by scanning an original, such as a silver halide x-ray film or other form of radiographic image).

Figure 1:
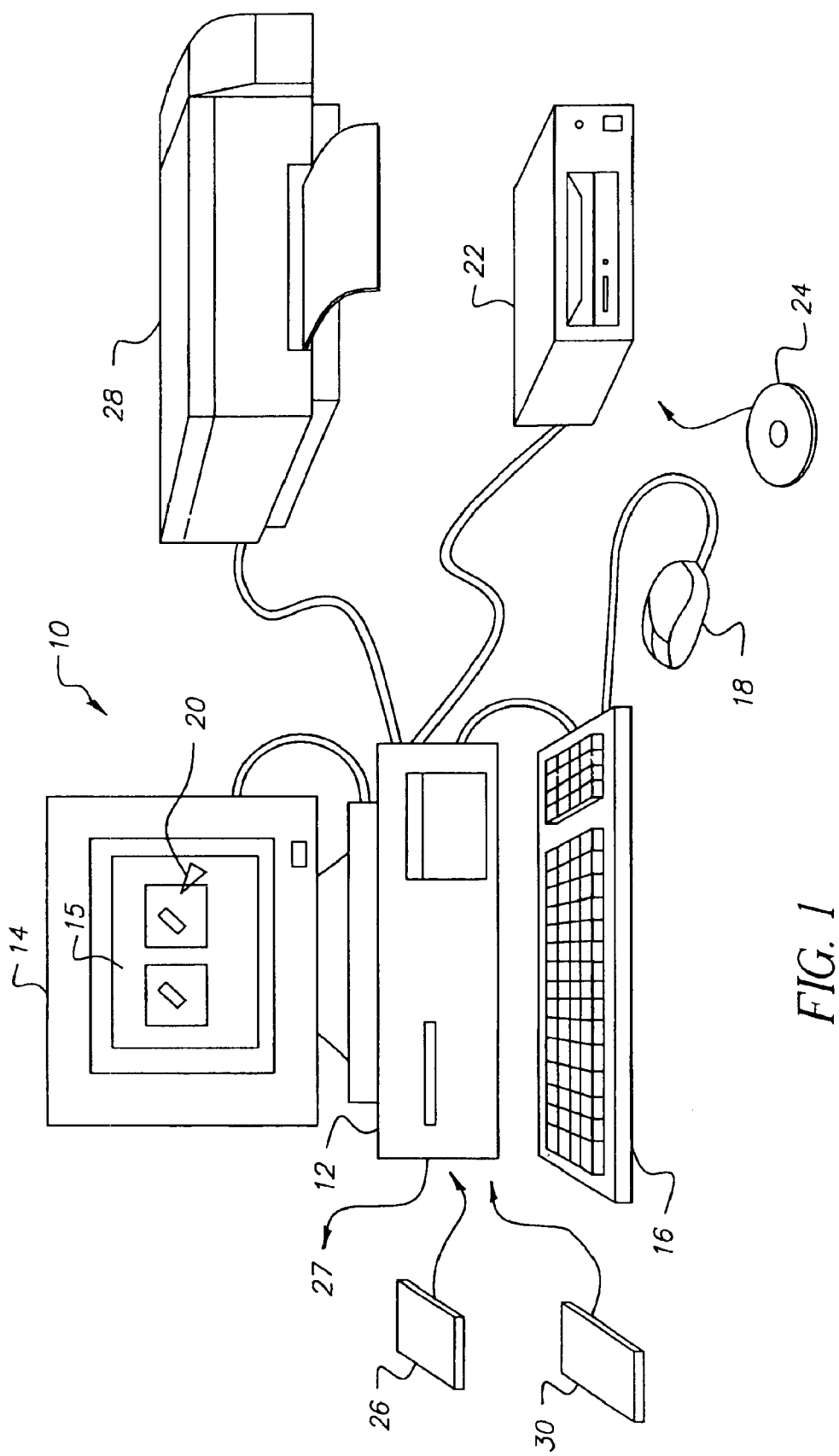
FIG. 1 is a perspective diagram of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface (GUI) 15. A keyboard 16 is also connected to the microprocessor based unit 12 for permitting a user to input information to the software. As an alternative to using the keyboard 16 for input, a mouse 18 may be used for moving a selector (cursor) 20 on the display 14 and for selecting an item on which the selector 20 overlays, as is well known in the art.

A compact disk-read only memory (CD-ROM) 22 is connected to the microprocessor based unit 12 for receiving software programs and for providing a means of inputting the software programs and other information to the microprocessor based unit 12 via a compact disk 24, which typically includes a software program. In addition, a floppy disk 26 may also include a software program, and is inserted into the microprocessor-based unit 12 for inputting the software program. Still further, the microprocessor-based unit 12 may be programmed, as is well known in the art, for storing the software program internally. The microprocessor-based unit 12 may also have a network connection 27, such as a telephone line, to an external network such as a local area network or the Internet. Accordingly, the software program may be received over the network, perhaps after authorizing a payment to a network site. A printer 28 is connected to the microprocessor-based unit 12 for printing a hardcopy of the output of the computer system 10.

Images may also be displayed as part of the graphical user interface 15 on the display 14 via a personal computer card (PC card) 30, such as, as it was formerly known, a PCMCIA card (based on the specifications of the Personal Computer Memory Card International Association) which contains digitized images electronically embodied in the card 30. The PC card 30 is ultimately inserted into the microprocessor based unit 12 for permitting visual display of the image on the display 14. Images may also be input via the compact disk 24, the floppy disk 26, or the network connection 27. Any images stored in the PC card 30, the floppy disk 26 or the compact disk 24, or input through the network connection 27, may have been obtained from a variety of sources, such as a digital intra-oral camera (not shown) or an x-ray image scanner (not shown).

Figure 2:
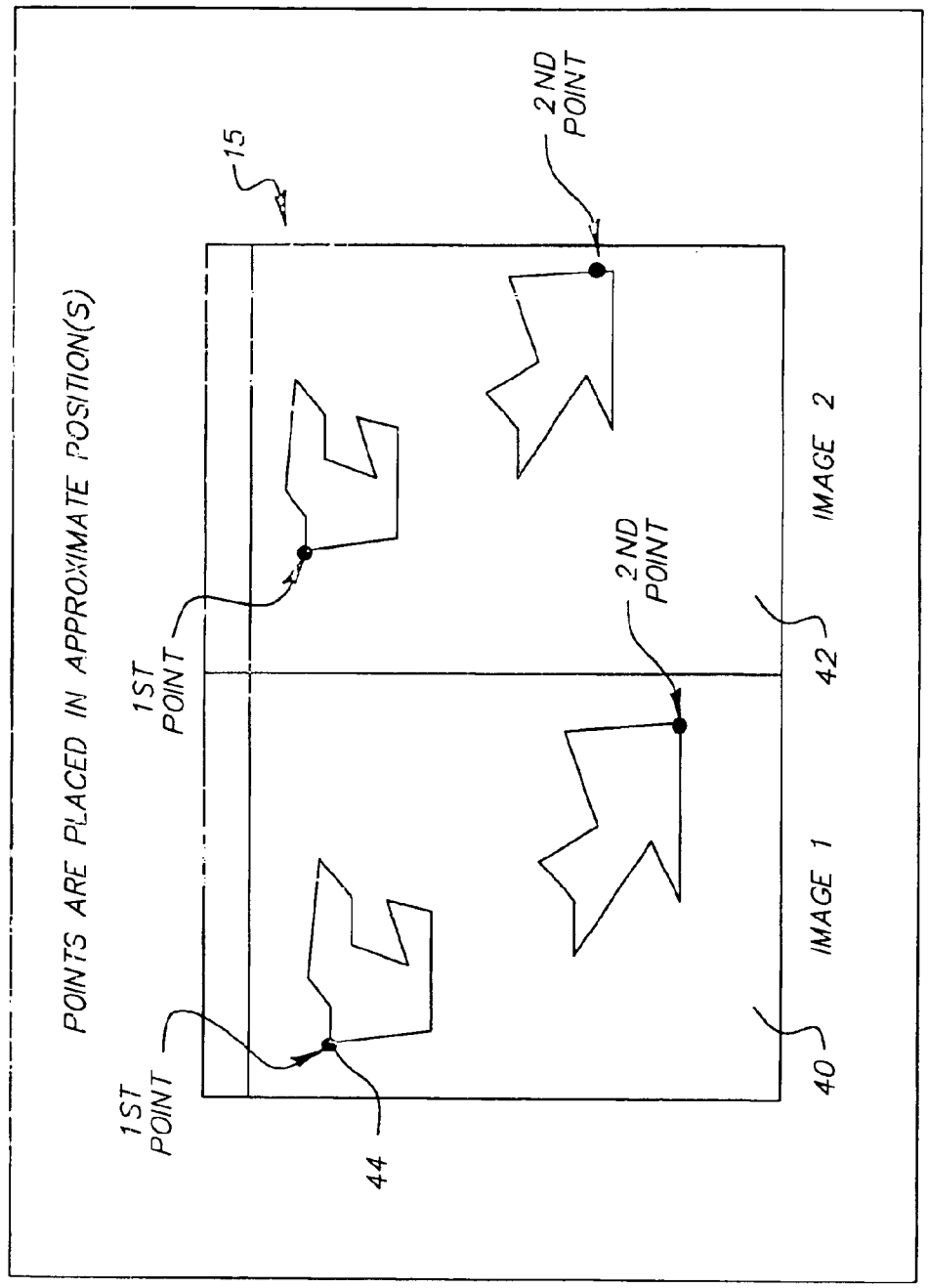
FIG. 2 is an illustration providing a view of a pair of dental x-rays intended to maintain context during initial point selection.
Figure 3:
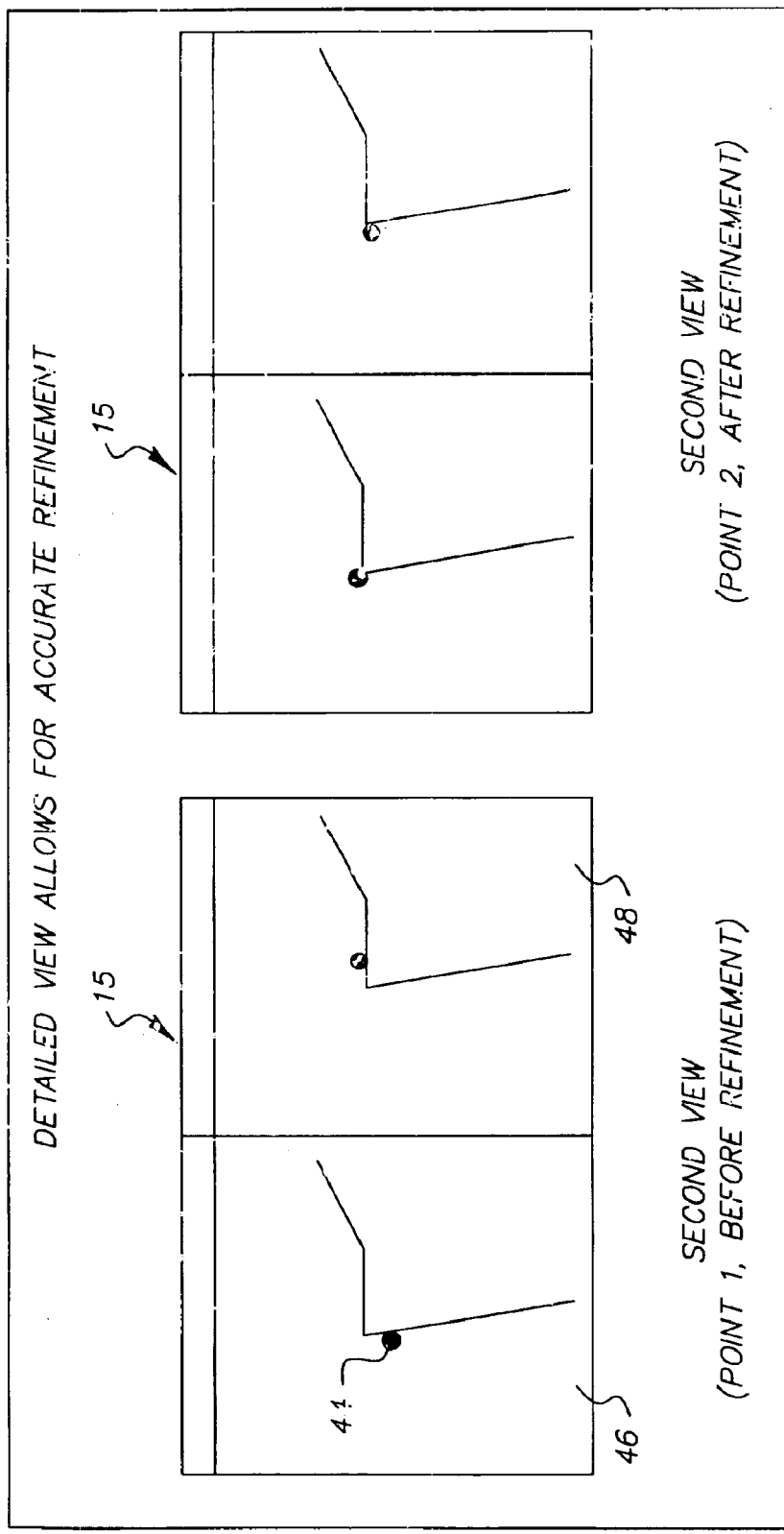
FIG. 3 is an illustration providing a detailed view of each pair of points to allow for fine adjustment, while automatically presenting each point pair in sequence to the user.
Figure 4:
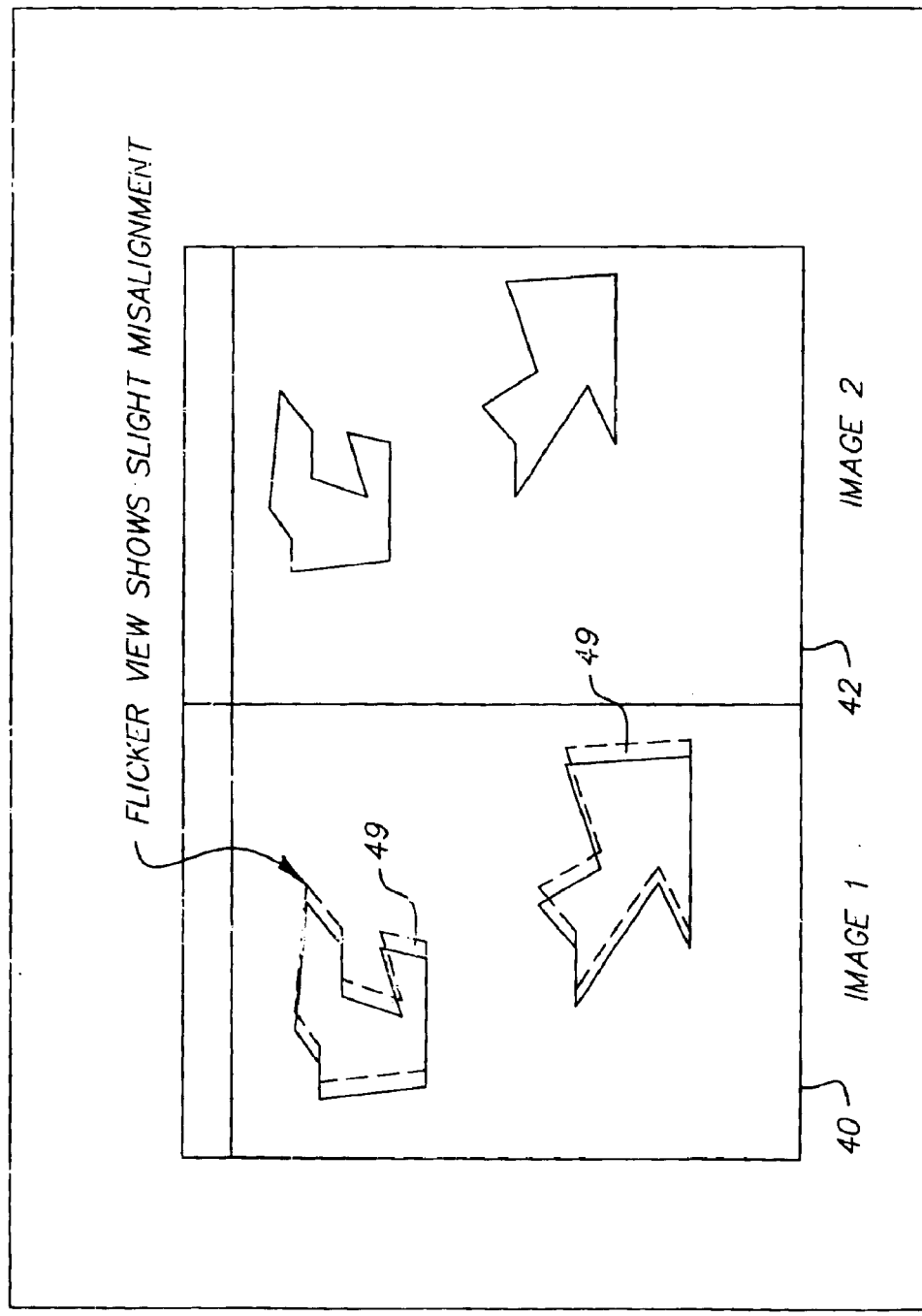
FIG. 4 is an illustration providing a view allowing direct comparison of the registered images to verify the quality of the registration.

The invention is useful in a subtractive radiography process where change detection is used to identify areas of differences among images of the same region that were collected at different times. Registration of the images is a prerequisite for the change detection process. In accordance with the invention, a series of comparative views of related images, as shown in FIGS. 2, 3 and 4, are produced and presented to a user through the graphical user interface 15 presented on the display 14. More specifically, these comparative views enable user-friendly registration of the images prior to engaging in a subtractive process for isolating changes between the images. Referring first to FIG. 2, the first view is designed to provide context to the user, i.e., to provide the user with full views relating all parts of the images. The two images 40 and 42 are presented via the graphical user interface 15 in a side-by-side manner, with each image "zoomed-out" in order to display the full extent of each image. At this point, while the original images 40 and 42 are likely to have at least approximately the same orientation and scale, the objects within the images may be rotated and positioned differently with respect to their appearance in each image. (Alternatively, the system may provide for rotation of the images prior to picking tie points to make it easier to see where you are (maintain context)).

The presentation shown in FIG. 2 is used to perform initial point selection of the reference points, which are commonly referred to as tie points. Each pair of tie points is intended to refer to the same image point in the same image feature in both images. The user simply places potential tie points 44 in their approximate positions in each of the images 40 and 42. Tie point identification (numbering) is handled automatically by the system, as is switching between images, i.e., once tie point number 1 has been placed in the left image 40, the user must place tie point number 1 in the right image 42. Then tie point 2 can be placed in the left image, tie point 2 in the right image, and so on. Once the user has roughly placed all desired tie points 44, the process proceeds to the second view shown in FIG. 3.

The second view shown in FIG. 3 is used to refine the placement of the tie points 44. Although the objects may still be rotated and positioned differently, the second view homes in on each of the tie points and presents a "zoomed-in" view of left and right image sections 46 and 48 around each of the tie points. Specifically, a detailed left image section view 46 around tie point 1 in the left image 40 is presented side-by-side to the detailed right image section view 48 of point 1 in the right image 42. The user can then refine the position of the points using the mouse 18 or the keyboard 16 to move the tie points to a new position. Once satisfied, the user manipulates the selector 20 to select a "next" or similar command and the system automatically presents the detailed views for points 2, 3, 4, etc. in sequence. The user can also delete points that when viewed in detail do not seem to match. When satisfied with all points, the user can then initiate the registration process by appropriate manipulation of the mouse 18 or the keyboard 16. (Alternatively, once two sets of the points have been selected by the user, the system can automatically predict the second point of all subsequent pairs.)

Once image registration has been completed, the third view shown in FIG. 4 is used to verify the quality of the registration. The two images 40 and 42 are again presented in a side-by-side manner. An additional capability is provided for one side of the graphical user interface 15, specifically the ability to automatically flicker the display rendered for the left image 40 between the two registered images. This is done by alternately displaying each of the registered images through one side of the graphical user interface 15, such that their intermittent overlap produces the effect of a flicker. By using the mouse 18 or keyboard 16, the user can vary the rate of the flicker, while directly observing the level of mismatch that there is between the sequentially presented images. The mismatch generally appears as movement between the flickered views, as represented in FIG. 4 by the relative separation 49 between the two images. A second additional capability is provided in which the side-by-side views 40 and 42 are synchronized in terms of zoom level, image center, and cursor position.

This capability allows the user to position the cursor on a point of interest in the left image 40, while the system automatically positions a second cursor over the corresponding point in the right image 42. The automatic positioning of the second cursor guarantees the unambiguous identification of the same point in each image—eliminating susceptibility to user error or confusion, and reduces the user workload.

Figure 5:
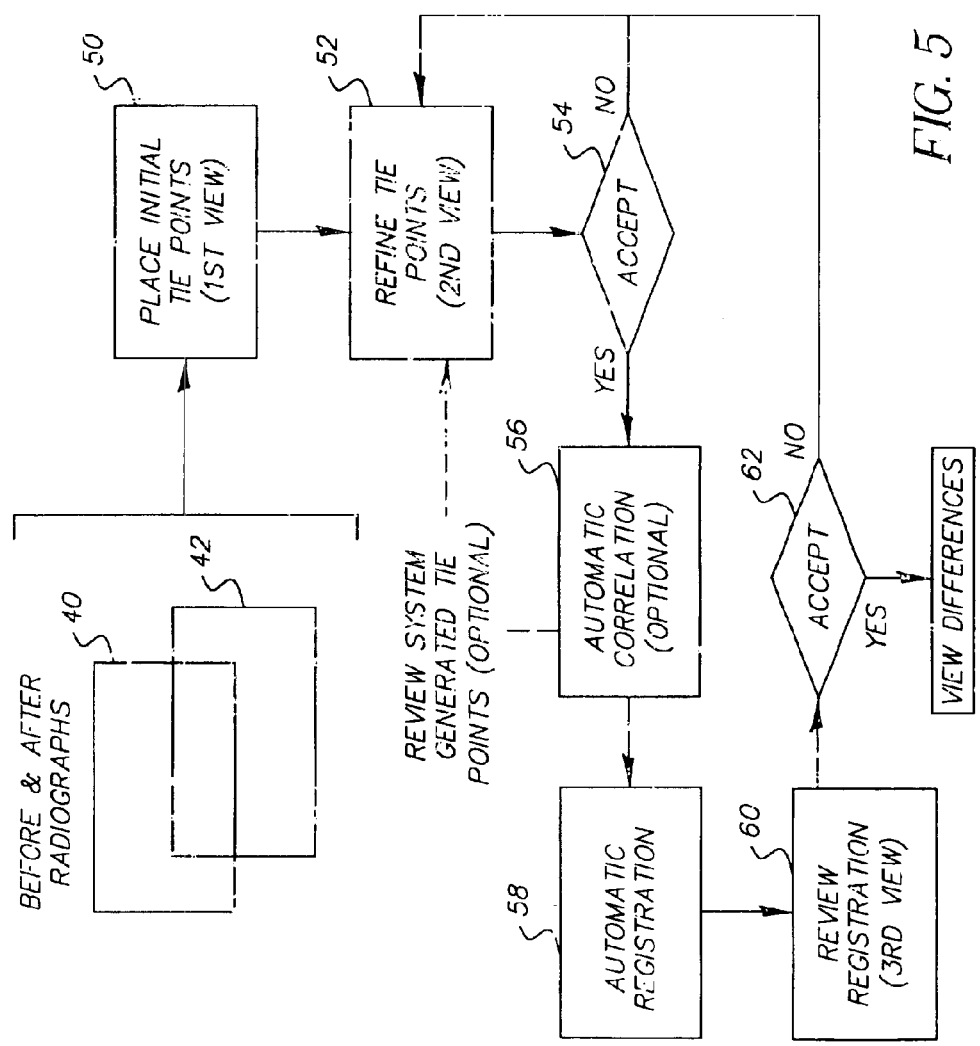
FIG. 5 is a block diagram of the various stages of the multi-view registration method according to the invention.

The automated method for placing reference points in a radiography application is shown in its several stages in FIG. 5 for the two images 40 and 42, which represent before and after radiographs of an oral object, such as a tooth ("before" and "after" is meant to represent a time sequence that would reveal, e.g., changes in the tooth or bone structure caused by a cavity or disease). The images 40 and 42 are processed by the computer system 10 and presented to a user via the graphical user interface 15, whereupon the user manipulates and places potential tie points 44 on the images 40 and 42 by using the mouse 18 or the keyboard 16. For example, the selector (cursor) 20 can be used to locate the potential tie points, as also represented in the first view shown in FIG. 2. This is done by means of conventional software in the placement stage 50 that records coordinates for the selected tie points, and which prompts the user to switch between images in a predetermined manner, i.e., once point number 1 has been placed in the left image 40, the user must place point number 1 in the right image 42, and so on through the other reference points. At least three reference points must be selected for the subsequent registration process, and more points are preferred for a more accurate and robust registration.

In the refinement stage 52, the more detailed views 46 and 48 are processed by conventional software that isolates an area around each of the potential tie points and presents each area in sequence to the user through the graphical user interface 15. After the tie points are refined to the liking of the user, as represented in the second view shown in FIG. 3, acceptance is signaled by an acceptance decision 54 through manipulation of the mouse 18 or the keyboard 16 (if, for any reason, the results are unacceptable, the process is returned to the refinement stage 52 until the result is acceptable). The result is a set of refined tie points that are suitable for the registration process.

Once accepted, the refined tie points can be used in conjunction with optional automatically correlated points in the correlation stage 56. These optional points may then be reviewed by the user. In the auto registration stage 58, a polynomial function is generated to relate the tie points. In its simplest form, the polynomial (alignment equation) is of the form $$X = a_1 + a_2 X' + a_3 Y'$$

with only three constants (and a similar equation for Y). Hence, locating three reference (tie) points that are common to two sequential images allows one to be rotated and stretched (warped) to align with the other. (See pages 201–208 on Alignment in *The Image Processing Handbook, Second Edition,* by John C. Russ, CRC Press, 1995). Typically, more tie points are involved in the registration process. For instance, in commonly-assigned U.S. Pat. No. 6,163,620 (entitled "Automatic Process for Detecting Changes Between Two Images"), which is incorporated herein by reference, between five and one hundred tie points are used. The polynomial function is then used in the auto registration stage 58 to warp the right image 42 to the left image 40 (or vice versa). Once registration is completed, the results are aligned side by side for review in the registration review stage 60, as also represented by the third view shown in FIG. 4. Known alignment techniques may be employed to render the left and right images for this view with the same zoom level and image centering. (cf., *The Image Processing Handbook*). Given the correlation between the images at this point, cursor placement in the left image can be mimicked by cursor placement at the same place in the right image. Likewise, a "zoom-in" on the left image can exactly matched by a corresponding "zoom-in" of the right image. If the user deems the registration adequate, acceptance is signaled by the acceptance decision 62 through manipulation of the mouse 18 or the keyboard 16; otherwise, the process is returned to the refinement stage 52 and repeated in an iterative manner until the registration results are acceptable to the user.

This invention is intended to enable an accurate registration of the two images prior to a subtractive radiography process. In a subtractive process of this type, subtracting one image from another effectively removes from the difference image all features that do not change, while highlighting or otherwise denoting those that do. Details of such a subtractive process, though not used in connection with radiography, are disclosed in the aforementioned U.S. Pat. No. 6,163,620, which is incorporated herein by reference. In a dental environment, this process can be used to isolate various types of temporal changes between radiographs of the same object taken at different times, e.g., to isolate bone loss due to periodontal disease (by looking under the gum line). It should be understood, however, that the registration review stage 60 is capable of producing a visual "differencing" effect (i.e., flickering) between the two images that may be sufficient in some cases to indicate the temporal change between the two images.

In summary, an image registration method has been described for dental X-ray imagery, in which specific views of the x-rays are provided to optimize tie point selection accuracy and efficiency. The first view maintains context during initial point selection. The second view provides a detailed view of each point pair, to allow for fine adjustment, while automatically presenting each point pair in sequence to the user. The third view is provided which allows direct comparison of the registered images.

The invention has been described with reference to a preferred embodiment. However, it will be appreciated that variations and modifications can be effected by a person of ordinary skill in the art without departing from the scope of the invention.

Parts List 10 computer system
12 microprocessor-based unit
14 display
15 graphical user interface
16 keyboard
18 mouse
20 selector
22 CD-ROM
24 CD
26 floppy disk
27 network connection
28 printer
30 PC card
40 left image
42 right image
44 tie points
46 left image section
48 right image section
49 relative separation (flicker)
50 placement stage
52 refinement stage
54 acceptance decision
56 auto correlation stage
58 auto registration stage
60 registration review stage
62 acceptance decision

What is claimed is:

1. A method for placing and confirming reference points associated with image registration for a radiographic image processing application, wherein the reference points identify similar image positions in separate images of substantially the same object, said method comprising the steps of:

obtaining first and second radiographic images representing substantially the same object taken at different times;

presenting a "zoomed out" view of the full extent of the first and second radiographic images side by side in a first graphical user interface view in order to allow a user to place potential reference points in their approximate locations on each image, all the while maintaining context for the user;

presenting a "zoomed in" view of an area of the first and second images around each of the potential tie points in a second graphical user interface view to allow the user to refine the placement of the potential reference points, thereby enabling the generation of refined reference points suitable for registration;

registering the first and second images by utilizing the refined reference points, thereby producing first and second registered images; and utilizing the registered images in a third graphical user interface view to indicate the amount of mismatch between the first and second images.

2. The method as claimed in claim 1 wherein the step of presenting a "zoomed out" view of the full extent of the two images side by side in a first view comprises constraining the user to locate a corresponding point in the second image after locating a point in the first image.

3. The method as claimed in claim 1 wherein the step of utilizing the registered images in a third view comprises alternately overlaying the first and second registered images in the third view to indicate the amount of mismatch between the pair of images.

4. The method as claimed in claim 1 wherein the step of overlaying the registered images in the third view causes the mismatch to appear as an image comparison.

5. The method as claimed in claim 1 wherein the step of utilizing the registered images in a third view comprises presenting the first and second registered images side by side in the third view synchronized in terms of zoom level, image center, and cursor position, whereby a position of a first cursor on a point of interest in the first image automatically positions a second cursor over the corresponding point of interest in the second image.

6. The method as claimed in claim 1 wherein the step of registering the first and second images comprises producing a polynomial correlation between the refined reference points of the two images and warping the two images until two registered images are obtained.

7. The method as claimed in claim 1 further comprising the step of processing the first and second registered images to provide a difference image indicative of change between the images.

8. A method for placing and confirming reference points associated with image registration for an intra-oral image processing application, wherein the reference points identify similar image positions in separate images of substantially the same object, said method comprising the steps of:
- obtaining first and second intra-oral images representing substantially the same object taken at different times;
- presenting a "zoomed out" view of the full extent of the first and second intra-oral images side by side in a first graphical user interface view in order to allow a user to place potential reference points in their approximate locations on each image, all the while maintaining context for the user;
- presenting a "zoomed in" view of an area of the first and second images around each of the potential tie points in a second graphical user interface view to allow the user to refine the placement of the potential reference points, thereby enabling the generation of refined reference points suitable for registration;
- registering the first and second images by utilizing the refined reference points, thereby producing first and second registered images; and
- utilizing the registered images in a third graphical user interface view to indicate the amount of mismatch between the first and second images.

9. The method as claimed in claim 8 wherein the step of presenting a "zoomed out" view of the full extent of the two images side by side in a first view comprises constraining the user to locate a corresponding point in the second image after locating a point in the first image.

10. The method as claimed in claim 8 wherein the step of utilizing the registered images in a third view comprises alternately overlaying the first and second registered images in the third view to indicate the amount of mismatch between the pair of images.

11. The method as claimed in claim 8 wherein the step of registering the first and second images comprises producing a polynomial correlation between the refined reference points of the two images and warping the two images until two registered images are obtained.

12. The method as claimed in claim 8 further comprising the step of processing the first and second registered images to provide a difference image indicative of change between the images.

13. A computer program product for placing and confirming reference points associated with image registration for a radiographic image processing application, wherein the reference points identify similar image positions in separate first and second radiographic images representing substantially the same object taken at different times, said computer program product comprising: a computer readable storage medium having a computer program stored thereon for performing the steps of:
- presenting a "zoomed out" view of the full extent of the first and second radiographic images side by side in a first graphical user interface view in order to allow a user to place potential reference points in their approximate locations on each image, all the while maintaining context for the user;
- presenting a "zoomed in" view of an area of the first and second images around each of the potential tie points in a second graphical user interface view to allow the user to refine the placement of the potential reference points, thereby enabling the generation of refined reference points suitable for registration;
- registering the first and second images by utilizing the refined reference points, thereby producing first and second registered images; and
- utilizing the registered images in a third graphical user interface view to indicate the amount of mismatch between the first and second images.

14. The computer program product as claimed in claim 13 wherein the step of presenting a "zoomed out" view of the full extent of the two images side by side in a first view comprises constraining the user to locate a corresponding point in the second image after locating a point in the first image.

15. The computer program product as claimed in claim 13 wherein the step of utilizing the registered images in a third view comprises alternately overlaying the first and second registered images in the third view to indicate the amount of mismatch between the pair of images.

16. The computer program product as claimed in claim 13 wherein the step of utilizing the registered images in a third view comprises presenting the first and second registered images side by side in the third view synchronized in terms of zoom level, image center, and cursor position, whereby a position of a first cursor on a point of interest in the first image automatically positions a second cursor over the corresponding point of interest in the second image.

17. The computer program product as claimed in claim 13 wherein the step of registering the first and second images comprises producing a polynomial correlation between the refined reference points of the two images and warping the two images until two registered images are obtained.

18. The computer program product as claimed in claim 13 wherein the program is provided over a network to the user.

19. A system for placing and confirming reference points associated with image registration for a radiographic image processing application, wherein the reference points identify similar image positions in separate first and second radiographic images representing substantially the same object taken at different times, said system comprising:
- a placement processing stage for presenting a "zoomed out" view of the full extent of the first and second radiographic images side by side in a first graphical user interface view in order to allow a user to place potential reference points in their approximate locations on each image, all the while maintaining context for the user;
- a refinement processing stage for presenting a "zoomed in" view of an area of the first and second images around each of the potential tie points in a second graphical user interface view to allow the user to refine the placement of the potential reference points, thereby enabling the generation of refined reference points suitable for registration;
- a correlation and registration processing stage for registering the first and second images by utilizing the refined reference points, thereby producing first and second registered images; and
- a registration review processing stage for utilizing the registered images in a third graphical user interface view to indicate the amount of mismatch between the first and second images.

20. The system as claimed in claim 19 wherein the placement processing stage constrains the user to locate a corresponding point in the second image after locating a point in the first image.

21. The system as claimed in claim 19 wherein the registration review processing stage alternately overlays the first and second registered images in the third view to indicate the amount of mismatch between the pair of images.

22. The system as claimed in claim 19 wherein the registration review processing stage presents the first and second registered images side by side in the third view synchronized in terms of zoom level, image center, and cursor position, whereby a position of a first cursor on a point of interest in the first image automatically positions a second cursor over the corresponding point of interest in the second image.

23. The system as claimed in claim 19 wherein the correlation and registration processing stage produces a polynomial correlation between the refined reference points of the two images and warps the two images until two registered images are obtained.

* * * * *